US011142806B2

(12) United States Patent
Kozono et al.

(10) Patent No.: US 11,142,806 B2
(45) Date of Patent: Oct. 12, 2021

(54) HEAT-TREATMENT APPARATUS AND HEAT-TREATMENT METHOD

(71) Applicants: MITSUI HIGH-TEC, INC., Kitakyushu (JP); KOYO THERMO SYSTEMS CO., LTD., Nara (JP)

(72) Inventors: Takeaki Kozono, Fukuoka (JP); Yusuke Hasuo, Fukuoka (JP); Showa Tachisato, Nara (JP); Shin Matsuda, Nara (JP)

(73) Assignees: MITSUI HIGH-TEC, INC., Fukuoka (JP); KOYO THERMO SYSTEMS CO., LTD., Nara (JP)

( * ) Notice: Subject to any disclaimer, the term of this patent is extended or adjusted under 35 U.S.C. 154(b) by 1194 days.

(21) Appl. No.: 15/056,051

(22) Filed: Feb. 29, 2016

(65) Prior Publication Data
US 2016/0258034 A1 Sep. 8, 2016

(30) Foreign Application Priority Data
Mar. 3, 2015 (JP) .............................. JP2015-041848

(51) Int. Cl.
*C21D 9/00* (2006.01)
*C21D 1/34* (2006.01)
*C21D 1/00* (2006.01)

(52) U.S. Cl.
CPC ............. *C21D 9/0025* (2013.01); *C21D 1/00* (2013.01); *C21D 1/34* (2013.01); *C21D 9/0018* (2013.01)

(58) Field of Classification Search
CPC .................................................. C21D 9/0025
See application file for complete search history.

(56) References Cited

U.S. PATENT DOCUMENTS

| | | | | |
|---|---|---|---|---|
| 3,396,684 A | * | 8/1968 | McLain | .................... F23M 5/06 |
| | | | | 110/335 |
| 4,223,877 A | * | 9/1980 | Sanderson | ........... C21D 9/0025 |
| | | | | 266/262 |
| 4,856,987 A | | 8/1989 | Yasuda et al. | |

FOREIGN PATENT DOCUMENTS

| | | |
|---|---|---|
| CN | 201485489 | 5/2010 |
| CN | 102147191 | 8/2011 |
| CN | 102560033 A | 7/2012 |
| CN | 202757448 | 2/2013 |

(Continued)

OTHER PUBLICATIONS

Alexey Sverdlin, "Types of Heat Treating Furnaces" ASM Handbook, vol. 4B, Steel Heat Treating Technologies, pp. 83-107 (2014).*

(Continued)

*Primary Examiner* — Christopher S Kessler
(74) *Attorney, Agent, or Firm* — Greenblum & Bernstein, P.L.C.

(57) ABSTRACT

A heat-treatment apparatus includes a casing, a loader which loads a workpiece to an inner part of the casing in order to apply a heat-treatment to the workpiece, and a canopy surface provided in the casing to cover the workpiece. The canopy surface includes a slope way with a sectional configuration where the canopy surface is cut on a plane vertical to a conveying direction of the workpiece inside the casing. The slope way includes a highest point and a downward inclined surface extending from the highest point to an outside of a zone between a perpendicular line extending from a left end of the workpiece and a perpendicular line extending from a right end of the workpiece.

16 Claims, 6 Drawing Sheets

(56) References Cited

FOREIGN PATENT DOCUMENTS

| | | |
|---|---|---|
| CN | 203999680 | 12/2014 |
| EP | 1 914 325 | 4/2008 |
| JP | 51-71849 | 12/1974 |
| JP | 52-154769 | 5/1976 |
| JP | 51-071849 | 6/1976 |
| JP | 52-154769 | 12/1977 |
| JP | 59-158361 | 10/1984 |
| JP | 61-213324 | 9/1986 |
| JP | 62-022498 | 2/1987 |
| JP | 62-22498 | 2/1987 |
| JP | 63-120093 U | 8/1988 |
| JP | 3-67991 | 3/1991 |
| JP | 3-70263 A | 7/1991 |
| JP | 7-42508 | 5/1995 |
| JP | 10-267544 | 10/1998 |
| JP | 11-97017 A | 4/1999 |
| JP | 2001-73026 A | 3/2001 |
| JP | 2002-20174 A | 1/2002 |
| JP | 2003-113421 | 4/2003 |
| JP | 2008-78402 | 4/2008 |
| KR | 2010-0107359 | 10/2010 |

OTHER PUBLICATIONS

Office Action issued in China Counterpart Patent Appl. No. 201610118321.0, dated Jun. 5, 2018 , along with an English translation thereof.

China Official Action recited in CN Application No. 201610118321.0, dated Feb. 26, 2019.

Office Action issued in Canada Counterpart Patent Appl. No. 2922168, dated Dec. 6, 2018.

Japan Notification of Reasons for Refusal received in JP Patent Application No. 2015-041848, dated Dec. 25, 2018.

Japanese Official Action received in JP Application No. 2015-041848, dated Jun. 11, 2018.

Office Action issued in Canada Counterpart Patent Appl. No. 2922168, dated Jul. 9, 2019.

Office Action issued in Canadian patent application No. 2,922,168, dated May 4, 2020.

* cited by examiner

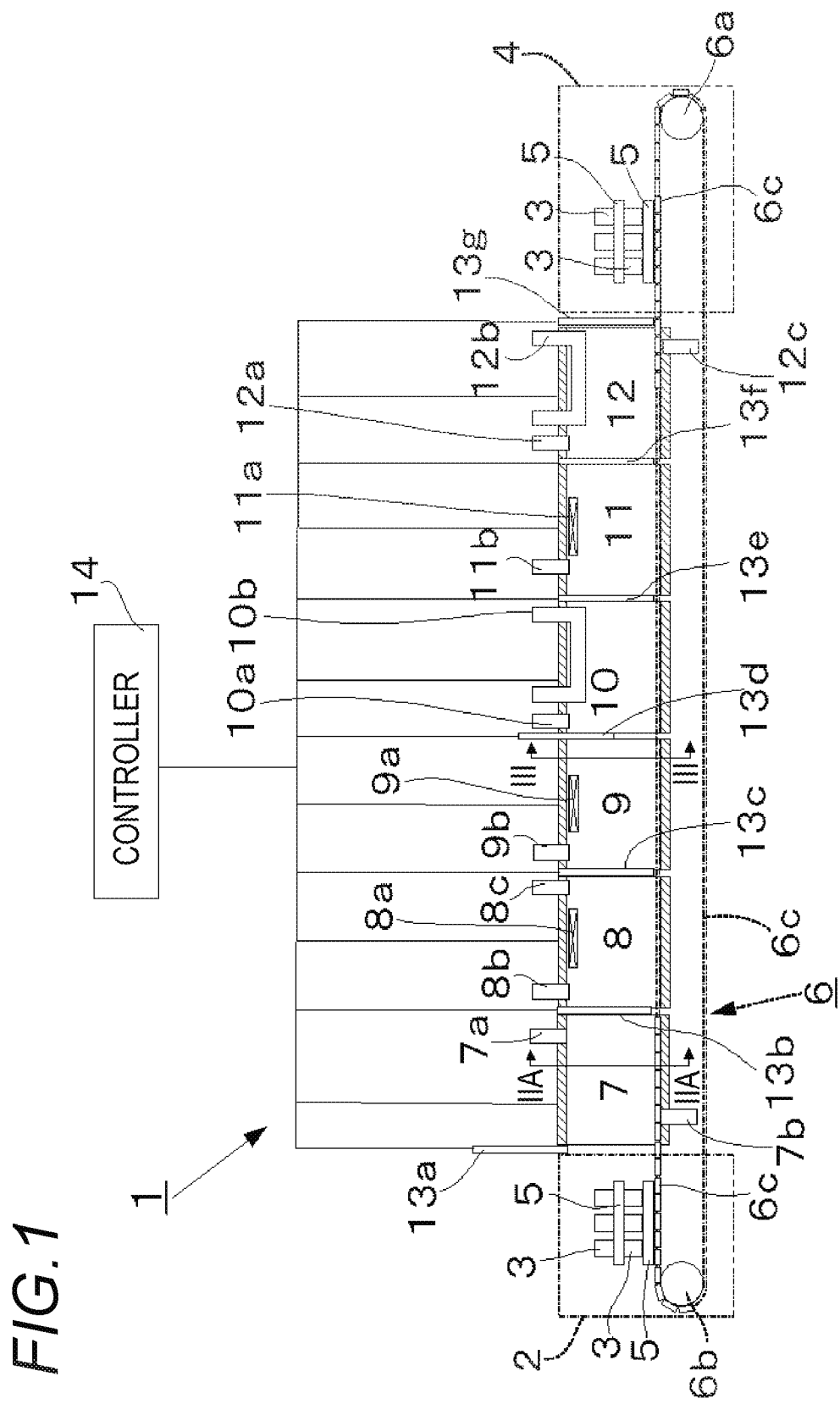

HEAT-TREATMENT APPARATUS AND HEAT-TREATMENT METHOD

CROSS REFERENCE TO RELATED APPLICATION(S)

This application is based upon and claims the benefit of priority of Japanese Patent Application No. 2015-41848 filed on Mar. 3, 2015, the contents of which are incorporated herein by reference in its entirety.

BACKGROUND OF THE INVENTION

1. Field of the Invention

The present invention relates to a heat-treatment apparatus and a heat-treatment method which change a quality of a workpiece by heating or cooling.

2. Description of the Related Art

A heat-treatment is a general term of a process which changes the quality of the workpiece. A technique is known that many workpieces are mounted on a conveying jig and fed to a heat-treatment furnace having a casing to carry out the heat-treatment (for instance, JP-A-2003-113421 as Patent Literature 1).

For instance, a laminated iron core such as an iron core of an armature of an electric motor or a generator is manufactured in such a way that raw sheets formed by blanking or stamping a thin plate such as an electromagnetic steel plate are laminated. In a manufacturing process of such a laminated iron core, various kinds of heat-treatments, for instance, an oil burning process, an annealing process and a blackening process are carried out. The oil burning process is a process that oil content such as stamping oil adhering to the surface of the raw sheet in working processes is evaporated and removed. The annealing process that is a process of removing a distortion or an internal stress of the raw sheet. The blackening process is also called a bluing process which forms a coat (what is called black rust) of tri-iron tetra-oxide ($Fe_3O_4$) on the surface of the raw sheet for a rust prevention. The oil burning process, the annealing process and the blackening process may be sometimes continuously carried out. For instance, in FIG. 1 of JP-B-7-42508 as Patent Literature 2, a continuous annealing and bluing device is disclosed in which a de-oiling furnace 2, an annealing furnace 3 and a bluing furnace 4 are connected together by a supply passage 1 to load workpieces to the furnaces respectively and unload the workpieces from the furnaces respectively. Further, a cooling process may be sometimes inserted between the processes (for instance, Patent Literature 2, an air cooling mechanism 50 in FIG. 1).

Patent Literature 1: JP-A-2003-113421
Patent Literature 2: JP-B-7-42508

SUMMARY OF THE INVENTION

In the heat-treatment apparatus having the plurality of heat-treatment furnaces arranged in series as disclosed in Patent Literature 2, the heat-treatment furnaces whose internal temperatures are different are adjacently arranged. Accordingly, when the workpieces are conveyed between the heat-treatment furnaces (namely, between processes), ambient atmosphere in the heat-treatment furnace is supplied to the adjacent heat-treatment furnace or zone. When the ambient atmosphere of relatively high temperature enters the heat-treatment furnace or zone of relatively low temperature, water content or the oil content included in the atmosphere of the high temperature may be sometimes liquefied in the zone of the low temperature. Namely, condensate may be possibly generated. When the condensate is generated on a ceiling surface of the heat-treatment furnace, a problem arises that water droplets or oil droplets drop to stain the workpieces.

In addition thereto, in recent years, the raw sheet which configures the iron core of the armature is liable to have its thickness more reduced in order to improve the property of the iron core of the armature. When the number of laminated raw sheets is increased, a quantity of the stamping oil adhering to the iron core of the armature is also increased. Further, in order to improve productivity, a blanking or stamping speed is increased or a plurality of thin sheets are piled and blanked or stamped out at the same time. In order to carry out these operations, the quantity of the stamping oil needs to be increased. Namely, in the recent years, the quantity of the stamping oil which is stuck to the iron core (the laminated iron core) of the armature is apt to be increased. Accordingly, in the heat-treatment furnace, the condensate of the stamping oil is apt to be generated. Further, the condensate is not generated only in the continuous heat-treatment furnace. Even in a single furnace, when the quantity of the adhering stamping oil is large, the condensate is liable to be generated.

The present invention is devised by considering the above-described circumstances, and it is a non limited object of the present invention to provide a heat-treatment apparatus and a heat-treatment method which hardly stain workpieces with water droplets or oil droplets generated by condensate.

A first aspect of the present invention provides a heat-treatment apparatus including: a casing; a loader which loads a workpiece to an inner part of the casing in order to apply a heat-treatment to the workpiece; and a canopy surface provided in the casing to cover the workpiece, wherein the canopy surface includes a slope way with a sectional configuration where the canopy surface is cut on a plane vertical to a conveying direction of the workpiece inside the casing, and the slope way includes a highest point and a downward inclined surface extending from the highest point to an outside of a zone between a perpendicular line extending from a left end of the workpiece and a perpendicular line extending from a right end of the workpiece.

The highest point of the slope way may be located between a left end and a right end of the canopy surface and the downward inclined surface may be provided in both sides of the highest point and extended toward the left end and the right end of the canopy surface. Alternatively, the highest point of the slope way may be located in a left end or a right end of the canopy surface and the downward inclined surface may be extended from the highest point toward the other end of the canopy surface.

The canopy surface may be a ceiling of the casing, or a lower surface of a roof shaped member arranged in the casing. Alternatively, the canopy surface may be a lower surface of a roof shaped member mounted on a conveying jig which moves inside the heat-treatment apparatus together with the workpiece. The roof shaped member may include a plurality of roof plates and the plurality of roof plates may be arranged with spaces in a vertical direction and are partly superposed in plan view.

The heat-treatment apparatus may further include a gate through which the workpiece passes; and a shield plate attached to the gate to be freely lifted and lowered, wherein the canopy surface may be formed in a lower end of the shield plate The canopy surface may include a plurality of grooves extending from a high position to a low position.

A second aspect of the present invention provides a heat-treatment method including: loading a workpiece to an inner part of a casing; applying a heat-treatment to the workpiece inside the casing, wherein during the heat-treatment to the work piece, oil droplets or water droplets generated in a canopy surface provided in the casing to cover the workpiece are guided outside a zone between a perpendicular line extending from a left end of the workpiece and a perpendicular line extending from a right end of the workpiece.

The heat-treatment method may be configured such that the canopy surface includes a slope way with a sectional configuration where the canopy surface is cut on a plane vertical to a conveying direction of the workpiece, and the slope way includes a highest point and a downward inclined surface extending from the highest point to the outside of the zone between the perpendicular line extending from the left end of the workpiece and the perpendicular line extending from the right end of the workpiece.

According to one of the aspects of the present invention, since the water droplets or the oil droplets generated in the canopy surface are guided to an end part of the canopy surface to drop the water droplets or the oil droplets from the end part, the water droplets or the oil droplets can be restrained from dropping from the canopy surface. Accordingly, an occurrence is reduced that the workpieces are stained with the water droplets or the oil droplets.

BRIEF DESCRIPTION OF THE DRAWINGS

In the accompanying drawings:

FIG. 1 is a conceptual sectional view showing a structure of a heat-treatment apparatus according to a first exemplary embodiment of the present invention;

DETAILED DESCRIPTION OF THE EXEMPLARY EMBODIMENTS

Figure 2A:
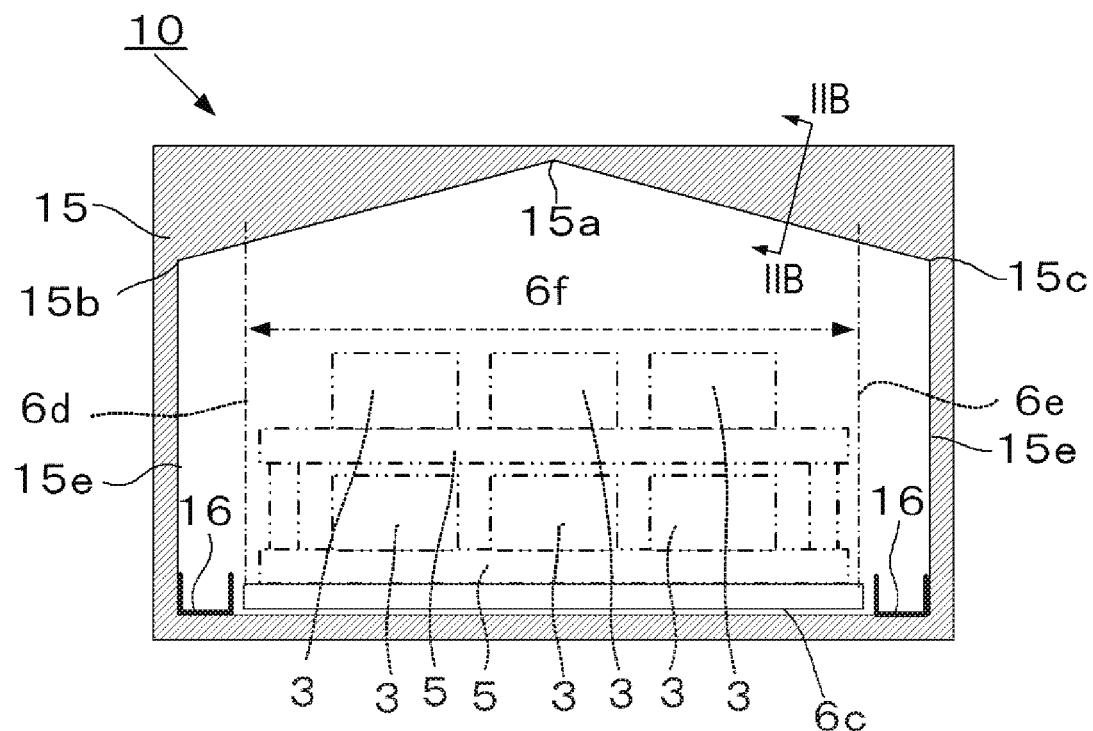
FIG. 2A is a cross-sectional view of a purge part of the heat-treatment apparatus shown in FIG. 1 taken along a line IIA-IIA in FIG. 1.

Now, a heat-treatment apparatus according to an exemplary embodiment of the present invention will be described below in detail by referring to the accompanying drawings. Here, a continuous furnace having sprocket wheels and an endless chain provided as a conveyor device is exemplified as a specific example of the heat-treatment apparatus. Further, as specific examples of a heat-treatment, an oil burning process, an annealing process, a blackening process and a cooling process are exemplified. As a specific example of a workpiece, a laminated iron core is exemplified.

First Exemplary Embodiment

FIG. 1 is a conceptual sectional view showing a structure of a heat-treatment apparatus 1 according to a first exemplary embodiment of the present invention. The heat-treatment apparatus 1 is an apparatus which carries out below-described various kinds of heat-treatments to a laminated iron core 3 loaded to a loading part 2 (or a loader) and unloads the laminated iron core 3 to an unloading part 4.

The laminate iron core 3 is an iron core which configures an armature of a rotating electric motor. The laminated iron core 3 is formed in such a way that a plurality of raw sheets formed by blanking or stamping out a thin plate such as what is called a magnetic steel plate by a press machine are laminated and connected together by a caulking work in another process not shown in the drawing. The laminated iron core 3 is mounted on a conveying jig 5 in a pre-process not shown in the drawing and loaded to the loading part 2. FIG. 1 shows a state that the conveying jig 5 on which the laminated iron cores 3 are mounted is stacked on the conveying jig 5 on which the laminated iron cores 3 are mounted and they are placed in the loading part 2. The laminated iron cores 3 and the conveying jigs 5 maintain the above-described state as they are, pass through various kinds of heat-treatment furnaces as described below and are unloaded to the unloading part 4.

The heat-treatment apparatus 1 is provided with a conveyor device 6 which conveys the conveying jig 5 on which the laminated iron cores 3 are mounted from the loading part 2 to the unloading part 4. Further, between the loading part 2 and the unloading part 4, a purge part 7, a de-oiling furnace 8, an annealing furnace 9, a first cooling part 10, a bluing furnace 11 and a second cooling part 12 are arranged in series. Further, in an entrance of the purge part 7, an exit of the second cooling part 12 and boundaries between the purge part 7 to the second cooling part 12, shutters 13 (13a to 13g) are arranged. The purge part 7, the de-oiling furnace 8, the annealing furnace 9, the first cooling part 10, the bluing furnace 11 and the second cooling part 12 exemplify the heat-treatment furnaces having a casing of the present invention. The shutters 13 (13a to 13g) exemplify gates.

The conveyor device 6 includes a driving sprocket wheel 6a arranged in the unloading part 4 and a driven sprocket wheel 6b arranged in the loading part 2. Between the driving sprocket wheel 6a and the driven sprocket wheel 6b, the endless chain not shown in the drawing is wound. In the endless chain, many slats 6c are arranged and attached in a moving direction of the endless chain. The driving sprocket wheel 6a is driven by the rotating electric motor not shown in the drawing.

Since subsequent processes are carried out in non-oxidation ambient atmosphere, the purge part 7 is a zone where, for instance, nitrogen gas is substituted for air. Accordingly, in the purge part 7, a nitrogen gas injection pipe 7a and an air discharge pipe 7b are arranged. When the conveying jig 5 on which the laminated iron cores 3 are mounted is supplied to the purge part 7, the shutter 13a is closed, nitrogen gas is injected from the nitrogen gas injection pipe 7a arranged in an upper part of the purge part 7. The air existing in the purge part 7 is discharged to an external part through the air discharge pipe 7b arranged in a lower part of the purge part 7.

The de-oiling furnace 8 is the heat-treatment furnace which evaporates oil content adhering to the raw sheets configuring the laminated iron core 3 in a blanking or stamping process, namely, the heat-treatment furnace which applies what is called an "oil burning process" to the laminated iron core 3. In the de-oiling furnace 8, a heater 8a is arranged which raises the temperature of the laminated iron core 3 to a de-oiling temperature (300 to 400° C. or so). Further, in a front end of the de-oiling furnace 8, a discharge pipe 8b is arranged which discharges ambient atmosphere in the de-oiling furnace 8 to an external part. In a rear end, a nitrogen gas injection pipe 8c which injects the nitrogen gas to the de-oiling furnace 8 is arranged respectively. Since the de-oiling furnace 8 is formed in such a way as described above, the laminated iron core 3 is heated in the nitrogen gas atmosphere and stamping oil adhering to the laminated iron core 3 is evaporated to the nitrogen gas. Then, the nitrogen gas including vapor of the stamping oil is discharged outside through the discharge pipe 8b. The de-oiling furnace 8 is arranged adjacently to the purge part 7 and the shutter 13b is arranged between the de-oiling furnace 8 and the purge part 7.

The annealing furnace 9 is the heat-treatment furnace which heats and anneals the laminated iron core 3. In the annealing furnace 9, a heater 9a is arranged which raises a temperature of the laminated iron core 3 to an annealing temperature (for instance, 800° C. or so) and keeps the temperature. Further, a nitrogen gas injection pipe 9b is arranged which injects the nitrogen gas to the annealing furnace 9. The annealing furnace 9 is arranged forward the de-oiling furnace 8 and the shutter 13c is arranged between the annealing furnace 9 and the de-oiling furnace 8.

The first cooling part 10 is a zone which cools the laminated iron core 3 whose annealing process is finished to a temperature suitable for starting a bluing process. In the first cooling part 10, a nitrogen gas injection pipe 10a and a cooling pipe 10b are arranged. The nitrogen gas injection pipe 10a is a pipeline which injects the nitrogen gas to the first cooling part 10. The cooling pipe 10b is a pipeline which introduces and supply outside air to the first cooling part 10 to cool an ambient atmosphere of the first cooling part 10. The outside air introduced from one end of the cooling pipe 10b carries out a heat exchange between the ambient atmosphere in the first cooling part 10 and the outside air. Namely, the outside air absorbs heat from the ambient atmosphere in the first cooling part 10. As a result, the temperature of the outside air rises to discharge the outside air from the other end of the cooling pipe 10b. The first cooling part 10 is arranged forward the annealing furnace 9. The shutter 13d is arranged between the annealing furnace 9 and the first cooling part 10.

The bluing furnace 11 is the heat-treatment furnace which forms a coat of tri-iron tetra-oxide ($Fe_3O_4$) on the surface of the laminated iron core 3. In the bluing furnace 11, are arranged a heater 1a which changes a temperature of an ambient atmosphere of the furnace in accordance with a time-temperature curve suitable for forming the coat and a gas supply nozzle 11b which supplies inert gas (the nitrogen gas) and water vapor. The bluing furnace 11 is arranged forward the first cooling part 10 and the shutter 13e is arranged between the bluing furnace 11 and the first cooling part 10.

The second cooling part 12 is a zone which cools the laminated iron core 3 whose bluing process is finished to an ordinary temperature. In the second cooling part 12, a nitrogen gas injection pipe 12a and a cooling pipe 12b are arranged. The nitrogen gas injection pipe 12a is a pipeline which injects the nitrogen gas to the second cooling part 12. The cooling pipe 12b is a pipeline which introduces and supplies cooling water supplied from a water supply unit not shown in the drawing to cool an ambient atmosphere in the second cooling part 12. The cooling water introduced from one end of the cooling pipe 12b carries out a heat exchange with the ambient atmosphere in the second cooling part 12. Namely, the cooling water absorbs heat from the ambient atmosphere in the second cooling part 12. As a result, the temperature of the cooling water rises to discharge the cooling water from the other end of the cooling pipe 12b. The second cooling part 12 is arranged forward the bluing furnace 11. The shutter 13f is arranged between the second cooling part 12 and the bluing furnace 11. The unloading part 4 is arranged forward the second cooling part 12 and the shutter 13g is arranged between the second cooling part 12 and the unloading part 4.

The shutters 13 (13a to 13g) are devices which prevent the ambient atmosphere respectively in the zones (the de-oiling furnace 8 to the second cooling part 12) from entering other zones and being discharged outside. The shutter 13 includes a main body (a shield plate) and an actuator (for instance, an air cylinder) not shown in the drawing which lifts and lowers the shield plate). In FIG. 1, as for the shutter 13a arranged in the entrance of the purge part 7, is shown a state that the shield plate is lifted, namely, a state that the entrance of the purge part 7 is opened. The shutter 13d arranged between the annealing furnace 9 and the first cooling part 10 shows a state that the shutter 13d is lifted to an intermediate height. As for other shutters 13b to 13c and 13e to 13g, are shown states that the shield plates are lowered, namely, the boundaries of the zones are respectively closed.

The heat-treatment apparatus 1 is controlled by a controller 14 provided with a computer not shown in the drawing. The controller 14 executes a program stored in the computer to control the conveyor device 6. Further, the controller 14 executes the program stored in the computer to open and close the shutters 13 (13a to 13g). Then, the controller 14 adjusts flow rates of the nitrogen gas supplied respectively to the purge part 7 and the zones (the de-oiling furnace 8 to the second cooling part 12). Further, controller 14 operates the de-oiling furnace 8, the annealing furnace 9 and the bluing furnace 11 and adjusts the cooling air and the cooling water supplied to the first cooling part 10 and the second cooling part 12.

The heat-treatment apparatus 1 is substantially operated by such a sequence as described below. Initially, an operator who uses, for instance, a hoist not shown in the drawing or a robot loads the conveying jig 5 on which the laminated iron cores 3 are mounted to the loading part 2. When the loading operation is finished, the operator turns on a start switch not shown in the drawing. When the start switch is turned on, the controller 14 commands the shutter 13a arranged in the entrance of the purge part 7 to open the entrance of the purge part 7. The controller 14 commands the conveyor device 6 to move the conveying jig 5 on which the laminated iron cores 3 are laminated to the purge part 7. After that, the controller 14 commands the shutter 13a to close the entrance of the purge part 7, and commands the purge part 7 to jet the nitrogen gas from the nitrogen gas injection pipe 7a. Then, when the ambient atmosphere of the purge part 7 is replaced by the nitrogen gas, the controller 14 commands the shutter 13b arranged in an entrance of the de-oiling furnace 8 to open the entrance of the de-oiling furnace 8. The controller 14 commands the conveyor device 6 to move the conveying jig 5 on which the laminated iron cores 3 are mounted to the de-oiling furnace 8. After that, the controller 14 commands the shutter 13b to close the entrance of the de-oiling furnace 8. The controller 14 commands the de-oiling furnace 8 to operate the heater 8a and remove the oil content adhering to the laminated iron core 3 mounted on the conveying jig 5. Namely, the "oil burning process" is applied to the laminated iron core 3. When the "oil burning process" is completed, the controller 14 commands the shutter 13c arranged in the boundary between the de-oiling furnace 8 and the annealing furnace 9 and the conveyor device 6 to move the conveying jig 5 on which the laminated iron cores 3 are mounted to the annealing furnace 9. Then, the controller 14 commands the shutter 13c to close an entrance of the annealing furnace 9. The controller 14 commands the annealing furnace 9 to operate the heater 9a and applies an "annealing process" to the laminated iron core 3. Subsequently, every time that the process is finished in each zone in the same way, the conveying jig 5 on which the laminated iron cores 3 are mounted is moved to a next zone to carry out a next process. When all the processed are completed, the conveying jig 5 on which the laminated iron cores 3 are mounted is moved to the unloading part 4.

Since the temperature of the ambient atmosphere in the purge part 7 is lower than the temperature of the ambient atmosphere in the de-oiling furnace 8 which is operated, when the shutter 13b is opened so that the ambient atmosphere in the de-oiling furnace 8 enters the purge part 7, condensate is liable to be generated in the purge part 7. Since the temperature of the ambient atmosphere in the de-oiling furnace 8 is lower than the temperature of the ambient atmosphere of the annealing furnace 9, when the shutter 13c is opened so that the ambient atmosphere in the annealing furnace 9 enters the de-oiling furnace 8, condensate is liable to be generated in the de-oiling furnace 8. Since the temperature of the ambient atmosphere in the first cooling part 10 is lower than the temperature of the ambient atmosphere of the annealing furnace 9, when the shutter 13d is opened so that the ambient atmosphere of the annealing furnace 9 enters the first cooling part 10, condensate is liable to be generated in the first cooling part 10. Further, since the temperature of the ambient atmosphere in the first cooling part 10 is lower than the temperature of the ambient atmosphere in the bluing furnace 11, when the shutter 13e is opened so that the ambient atmosphere in the bluing furnace 11 enters the first cooling part 10, condensate is liable to be generated in the first cooling part 10. Since the temperature of the ambient atmosphere in the second cooling part 12 is lower than the temperature of the ambient atmosphere in the bluing furnace 11, when the shutter 13f is opened so that the ambient atmosphere in the bluing furnace 11 enters the second cooling part 12, condensate is liable to be generated in the second cooling part 12.

Figure 2B:
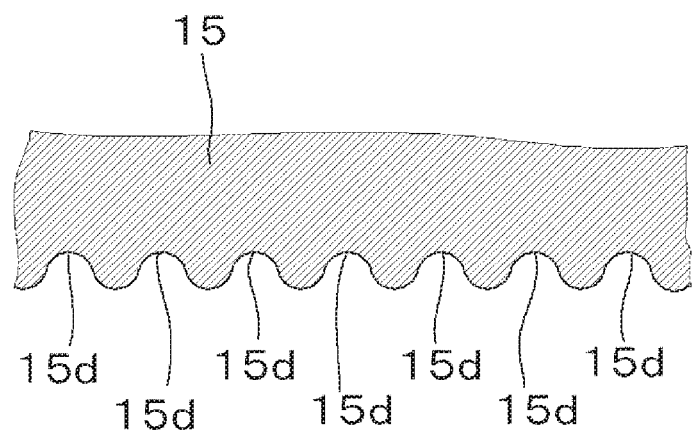
FIG. 2B is a sectional view of a casing of the purge part taken along a line IIB-IIB in FIG. 2A.

FIG. 2A is a cross-sectional view of the purge part 7 taken along a line IIA-IIA in FIG. 1. As shown in FIG. 2A, a ceiling surface of an inner surface of the casing 15 which forms an outline of the purge part 7 is provided with an inclination which is highest in a central part 15a and lowest in a left end 15b and a right end 15c. Further, the ceiling surface is formed to be symmetrical. The central part 15a is located just at an intermediate part of the left end 15b and the right and 15c. A height of the left end 15b is the same as a height of the right end 15c. Accordingly, the left end 15b and the right end 15c are located in positions lower than all other parts of the ceiling surface. Further, as shown in FIG. 2B, in an inclined surface from the central part 15a of the ceiling surface to the right end 15c, many grooves 15d are formed along a geodesic line of the inclined surface, namely, in a direction where an inclination is maximum. In an inclined surface from the central part 15a to the left end 15b, many grooves are also formed. The ceiling surface exemplifies a canopy surface according to the present invention. The grooves 15d may be arbitrarily formed. The ceiling surface may be formed as a smooth surface having no grooves.

Since the ceiling surface of the casing 15 is formed in such a way as described above, oil droplets condensed on the ceiling surface flow from the central part 15a to the left end 15b and the right end 15c, and further flow downward along a wall surface 15e. On a bottom part of the casing 15, an oil reservoir part 16 is provided. The oil droplets flowing along the wall surface 15e enters the oil reservoir part 16. After that, the droplets pass a drain pipe not shown in the drawing and are discharged outside.

The central part 15a is the highest point of a slope way formed on the ceiling surface of the casing 15. The left end 15b and the right end 15c correspond to terminal ends of downward inclined surfaces which extend from the central part 15a. The left end 15b and the right end 15c, namely, the terminal ends of the downward inclined surfaces extending from the central part 15a are located outside a zone 6f between a perpendicular line 6d extending from a left end of the slat 6c of the conveyor device 6 and a perpendicular line 6e extending from a right end of the slat 6c.

Further, since many grooves 15d are formed on the ceiling surface so that a surface area is larger than that when the surface is formed to be smooth, the oil droplets sticking to the ceiling surface hardly drop. Further, since the grooves 15d are formed in the direction where the inclination is maximal in the ceiling surface, the oil droplets sticking to the ceiling surface rapidly flow to the left end 15b or to the right end 15c along the grooves 15d. Accordingly, the oil droplets sticking to the ceiling surface hardly drop from the ceiling surface, so that the laminated iron core 3 is hardly stained with the oil droplets.

Figure 3:
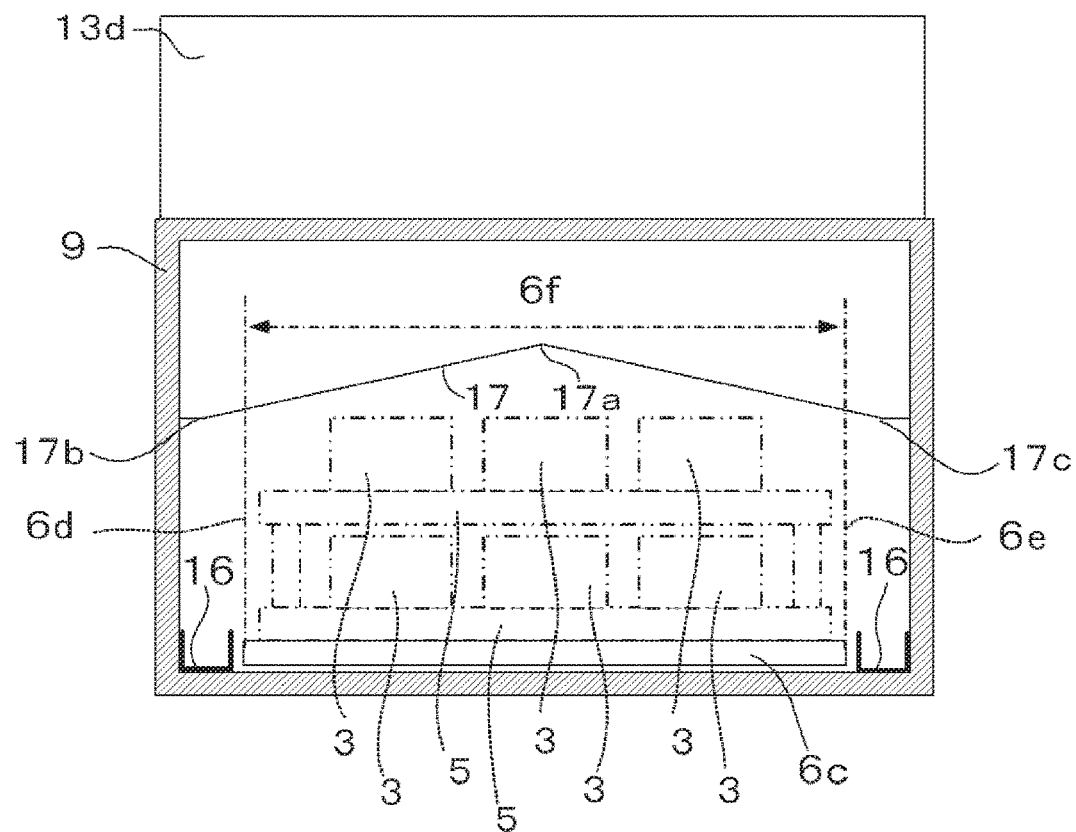
FIG. 3 is a cross-sectional view of an annealing furnace of the heat-treatment apparatus shown in FIG. 1 taken along a line III-III in FIG. 1.

FIG. 3 is a cross-sectional view of the annealing furnace 9 taken along a line III-III in FIG. 1. In FIG. 3, the shutter 13d arranged in the boundary between the annealing furnace 9 and the first cooling part 10 is seen from a left side in FIG. 1. As shown in FIG. 3, a lower end 17 of the shutter 13d is formed in such a way that a central part 17a is the highest and a left end 17b and a right end 17c are the lowest. The lower end 17 is also formed to be symmetrical. The central part 17a is located just in an intermediate part of the left end 17b and the right end 17c. A height of the left end 17b is the same as a height of the right end 17c. Accordingly, the left end 17b and the right end 17c are located at positions lower than those of all other parts. In the lower end 17, the same grooves as the grooves 15d in the casing 15, which are not shown in the drawing, are also formed. The lower end 17 exemplifies a canopy surface formed in a lower end of the shield plate.

Since the shutter 13*d* is formed as described above, oil droplets generated due to condensate on the shutter 13*d* rapidly flow from the central part 17*a* to the left end 17*b* and the right end 17*c*. Accordingly, when the laminated iron core 3 passes a lower part of the shutter 13*d*, the laminated iron core 3 is hardly stained with the oil droplets dropping from the lower end 17.

Second Exemplary Embodiment

In the first exemplary embodiment, a configuration is shown as the example that in a sectional form of the casing 15 or the shutter 13*d* where the casing 15 or the shutter 13*d* is cut on a plane vertical to a conveying direction of the laminated iron core 3 by the conveyor device 6, a path extending to the left end part or the right end part from an arbitrary point in the ceiling surface of the casing 15 or the lower end 17 of the shutter 13*d* forms the slope way whose height is gradually smaller as the path comes nearer to the end part in all the zones. Namely, the example is shown that the slope way is formed in the ceiling surface of the sectional form of the casing 15. However, a new or additional member may be added in the casing 15 so as to form a slope way by the new member. This structure is especially available when the present invention is applied to an existing heat-treatment apparatus. Now, referring to FIG. 4, a second exemplary embodiment will be described below.

Figure 4:
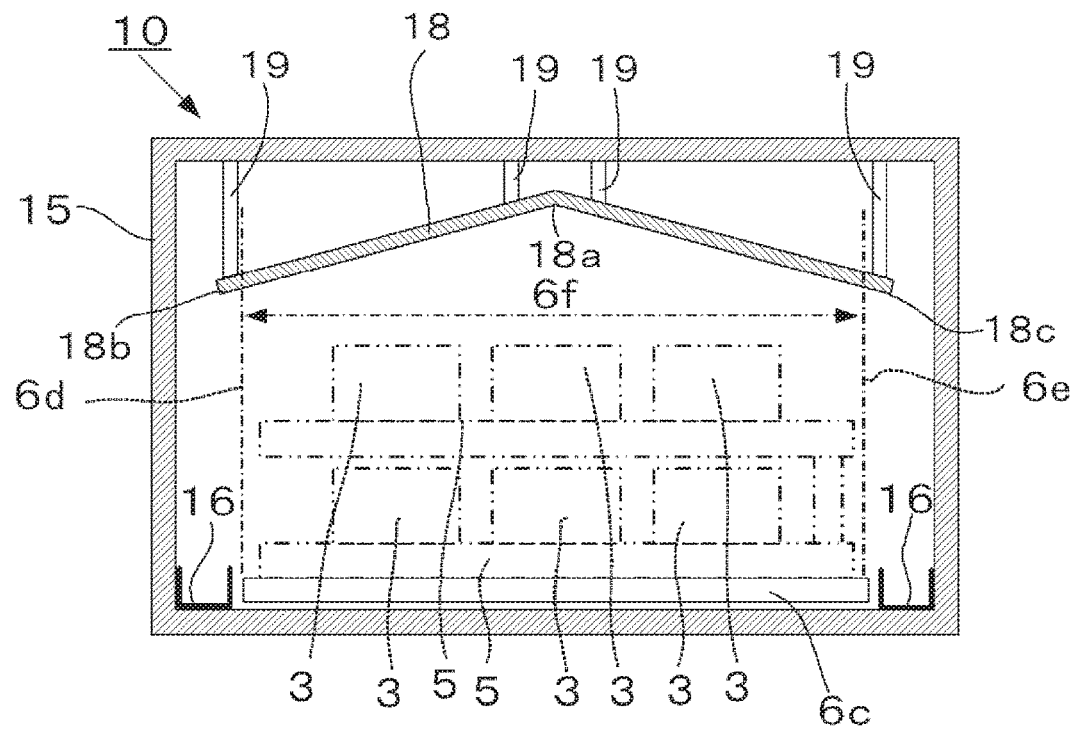
FIG. 4 is an explanatory view showing a structure of a first cooling part according to a second exemplary embodiment of the present invention, and a cross-sectional view corresponding to FIG. 2A.

As shown in FIG. 4, in a casing 15, a roof shaped member 18 is suspended from a ceiling surface of the casing 15 through suspension posts 19. The roof shaped member 18 is arranged in the casing 15 throughout an entire length (a transverse direction in FIG. 1) of the casing 15 to cover all laminated iron cores 3 mounted on a conveying jig 5. The roof shaped member 18 is provided with an inclination in a cross-sectional form as shown in FIG. 4 that a central part 18*a* is the highest and a left end 18*b* and a right end 18*c* are the lowest. Further, the ceiling surface is formed to be symmetrical. The central part 18*a* is located just at an intermediate part of the left end 18*b* and the right end 18*c*. Heights of the left end 18*b* and the right end 18*c* are the same. On a lower surface of the roof shaped member 18, the same grooves as the grooves 15*d* in the casing 15 are also formed. A material of the roof shaped member 18 is not particularly limited. A suitable material may be selected from heat resisting materials which can endure a temperature of an ambient atmosphere of a zone in which the roof shaped member 18 is arranged.

Since the roof shaped member 18 is formed in such a way as described above, oil droplets condensed on the lower surface of the roof shaped member 18 rapidly flow from the central part 18*a* to the left end 18*b* and the right end 18*c*, and drop to an oil reservoir part 16 from the left end 18*b* and the right end 18*c*. Accordingly, a laminated iron core 3 is hardly stained with the oil droplets which drop on the laminated iron core 3.

The central part 18*a* is the highest point of a slope way formed on the lower surface of the roof shaped member 18. The left end 18*b* and the right end 18*c* correspond to terminal ends of downward inclined surfaces which extend from the central part 18*a*. The left end 18*b* and the right end 18*c*, namely, the terminal ends of the downward inclined surfaces extending from the central part 18*a* are located outside a zone 6*f* between a perpendicular line 6*d* extending from a left end of a slat 6*c* of a conveyor device 6 and a perpendicular line 6*e* extending from a right end of the slat 6*c*.

Third Exemplary Embodiment

In the first and second exemplary embodiments, examples are shown that the member configuring the canopy surface is fixed and installed in the heat-treatment apparatus 1. However, a member having a canopy surface may be moved together with a conveying jig 5. In such a structure, the present invention can be easily and inexpensively applied to an existing heat-treatment apparatus 1. Now, by referring to FIG. 5, a third exemplary embodiment will be described below.

Figure 5:
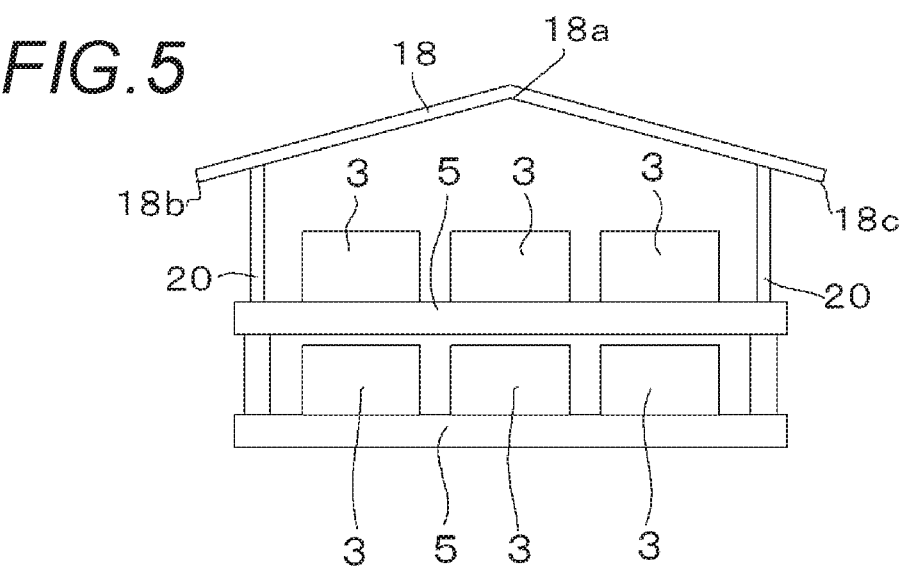
FIG. 5 is an explanatory view showing a state that a roof shaped member according to a third exemplary embodiment of the present invention is mounted on a conveying jig.

As shown in FIG. 5, to a roof shaped member 18, base posts 20 are attached. The base posts 20 are supported by a conveying jig 5 in lower surfaces of the base posts 20. Namely, the roof shaped member 18 is mounted on the conveying jig 5 through the base posts 20 and can be moved together with the conveying jig 5 in a heat-treatment apparatus 1. As in the case of the second exemplary embodiment, oil droplets condensed on a lower surface of the roof shaped member 18 rapidly flow from a central part 18*a* to a left end 18*b* and a right end 18*c*, and drop from the left end 18*b* and the right end 18*c*. Accordingly, a laminated iron core 3 is hardly stained with the oil droplets dropping on the laminated iron core 3.

As in the third exemplary embodiment, the central part 18*a* is the highest point of a slope way formed on the lower surface of the roof shaped member 18. The left end 18*b* and the right end 18*c* correspond to terminal ends of downward inclined surfaces which extend from the central part 18*a*. The left end 18*b* and the right end 18*c*, namely, the terminal ends of the downward inclined surfaces extending from the central part 18*a* are located outside a zone 6*f* between a perpendicular line 6*d* extending from a left end of a slat 6*c* of a conveyor device 6 and a perpendicular line 6*e* extending from a right end of the slat 6*c*.

The exemplary embodiments of the present invention are described above. However, they exemplify specific exemplary embodiments of the present invention and do not define a technical scope of the present invention definitely. The present invention can be freely modified, applied or improved and executed applied or improved to be executed as long as the present invention has a technical idea described in claims.

Figure 6A:
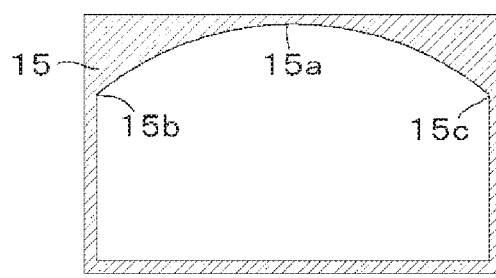
FIGS. 6A to 6C are explanatory views of a casing showing a modified example of the present invention and cross-sectional views corresponding to FIG. 2B.
Figure 6B:
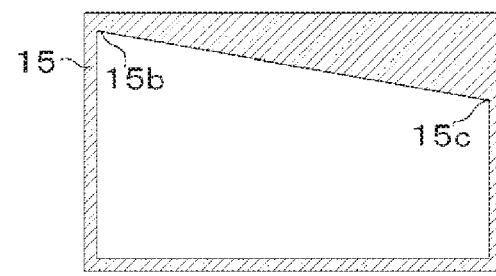
Figure 6C:
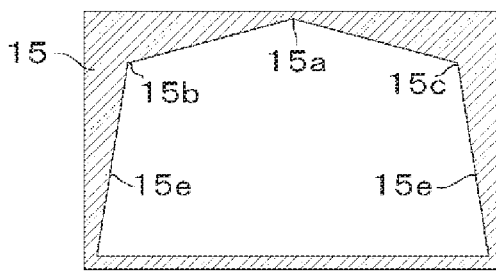

In the exemplary embodiments respectively, examples are shown that a cross-sectional form of the canopy surface is formed with straight lines. However, the canopy surface is not limited to such a form. For instance, as shown in FIG. 6A, a cross-sectional form may be formed with a curve. The cross-sectional form of the canopy surface is not limited to a symmetrical form. For instance, in FIG. 2A, the central part 15*a* may be set to be nearer to the left end 15*b* or to the right end 15*c* from the intermediate part between the left end 15*b* and the right end 15*c*. Otherwise, the heights of the left end 15*b* and the right end 15*c* may be set to be different from each other. The cross-sectional form of a hood shaped member is not limited to a form that the central part 15*a* is the highest. For instance, as shown in FIG. 6B, a left end 15*b* may be set to be the highest and a right end 15*c* may be set to be the lowest. Namely, oil droplets may be allowed to flow from the left end 15*b* to the right end 15*c*. The above-described matter may be applied to the configuration of the lower end 17 of the shutter 13*d*. In short, the canopy surface according to the present invention may have any of configurations as long as an arbitrary point located on the canopy surface in a sectional form cut on a plane vertical to a conveying direction of a workpiece usually has a downward slope way directed to either the left end part of the canopy surface or the right end part from that point, and the slope way is usually a downward slope without changing halfway to an upward slope. Further, the wall surface 15e of the casing 15 is not limited to a wall configuration which is allowed to vertically stand. As shown in FIG. 6C, the right and left wall surfaces 15e may collapse inside.

Figure 7A:
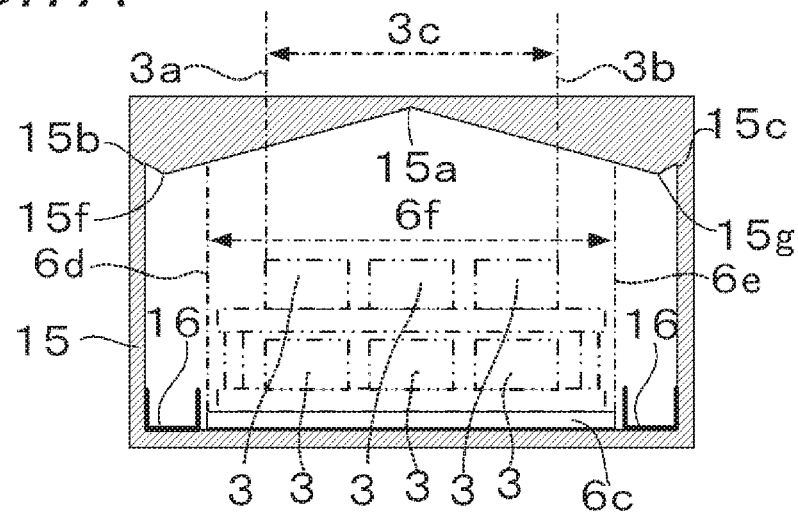
FIGS. 7A to 7C are explanatory views of a casing showing another modified example of the present invention and cross-sectional views corresponding to FIG. 2A.
Figure 7B:
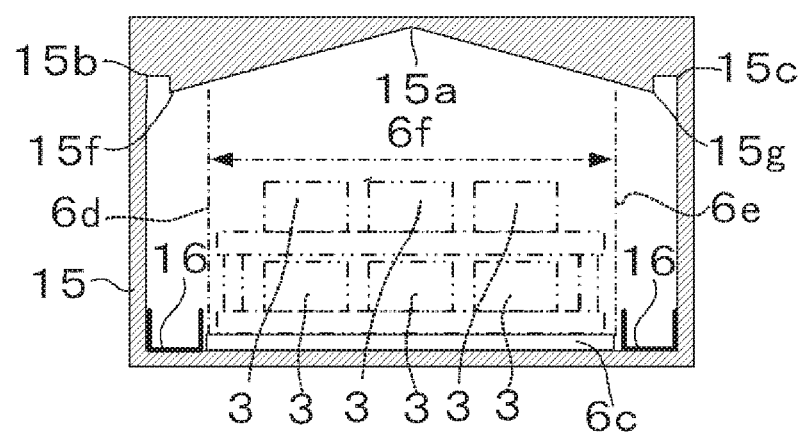
Figure 7C:
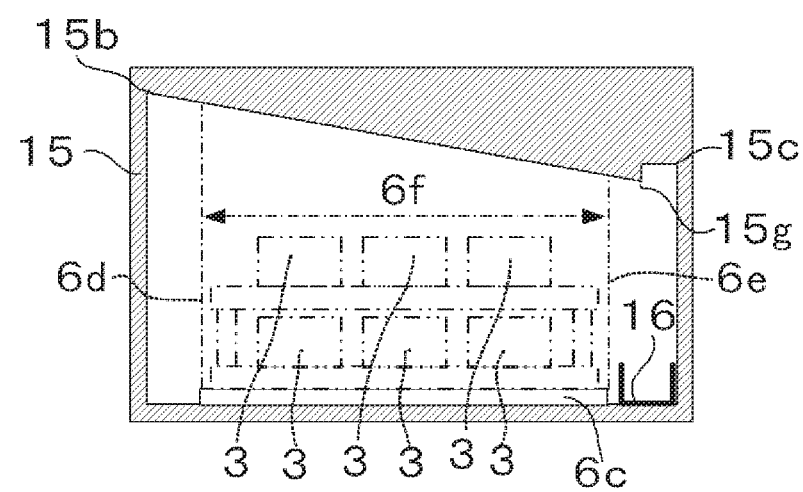

In the first exemplary embodiment, an example is shown that the downward inclined surfaces extending from the central part 15a reach the left end 15b and the right end 15c of the canopy surface. However, the downward inclined surfaces may not reach the left end 15b and the right end 15c. The downward inclined surfaces which extend from the highest point of the slope way is satisfactorily extended outside the zone between the perpendicular line extending from a left end of the workpiece and the perpendicular line extending from a right end of the workpiece. For instance, as shown in FIG. 7A and FIG. 7B, a central part 15a may be set to the highest point of a canopy surface, downward inclined surfaces may be formed in both right and left sides of the central part 15a and terminal ends 15f and 15g of the downward inclined surfaces may be located outside a zone 6f between a perpendicular line 6d extending from a left end of a slat 6c of a conveyor device 6 and a perpendicular line 6e extending from a right end of the slat 6c. Otherwise, as shown in FIG. 7C, when a left end 15b is set to the highest point of a canopy surface, a terminal end 15g of a downward inclined surface directed to a right end 15c from the left end 15b may be set to be located in a right side of a perpendicular line 6e extending from a right end of the slat 6c of the conveyor device 6, namely, outside the zone 6f. In such structures, water droplets or oil droplets generated due to condensate in the canopy surface flow to the terminal ends 15f and 15g along the downward inclined surfaces and drop to an oil reservoir part 16 from the terminal ends 15f and 15g. Accordingly, a laminated iron core 3 is not stained with the water droplets or the oil droplets.

Further, in the first exemplary embodiment to the third exemplary embodiment and the above-described modified examples, examples are shown that the terminal ends of the downward inclined surfaces are located outside the zone 6f between the perpendicular line 6d extending from the left end of the slat 6c of the conveyor device 6 and the perpendicular line 6e extending from the right end of the slat 6c. However, the terminal ends of the downward inclined surfaces may be located slightly inside the zone 6f. For instance, as shown in FIG. 7A, when the terminal ends 15f and 15g are located outside a zone 3c between a perpendicular line 3a extending form a left end of a laminated iron core 3 arranged in a left end and a perpendicular line 3b extending from a right end of a laminated iron core arranged in a right end, downward inclined surfaces are extended outside the zone between the perpendicular line extending from the left end of the workpiece and the perpendicular line extending from the right end of the workpiece.

Figure 8A:
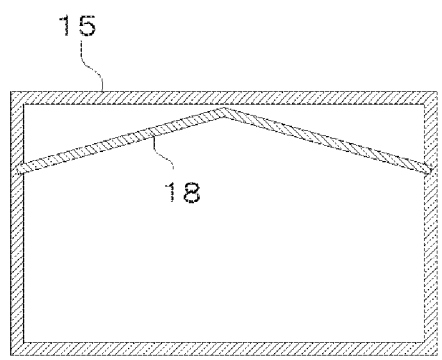
FIGS. 8A to 8D are explanatory views of a roof shaped member showing a still another modified example of the present invention and cross-sectional views corresponding to FIG. 4.
Figure 8C:
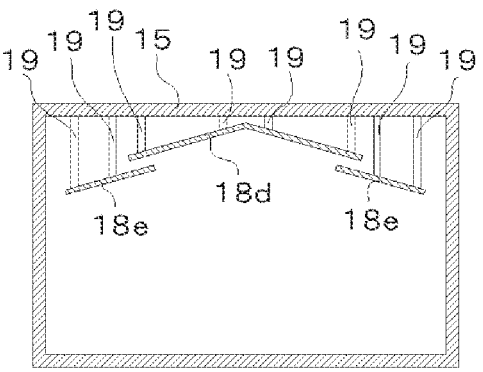
Figure 8B:
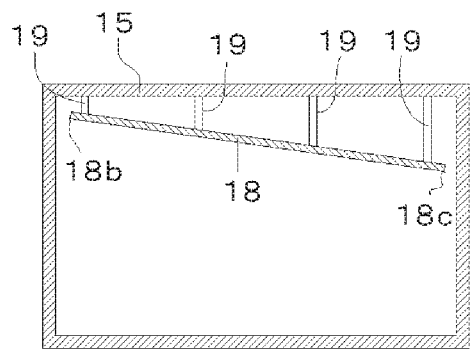
Figure 8D:
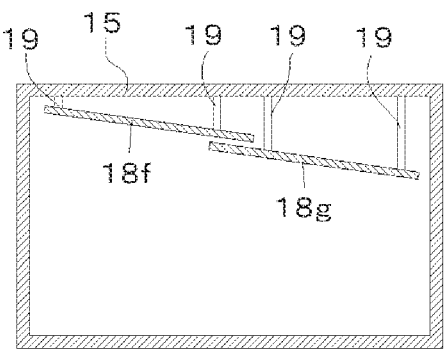

An attaching structure of the roof shaped member 18 fixed to the casing 15 is not limited to what is called a suspension roof. As shown in FIG. 8A, the roof shaped member 18 may be supported by the right and left wall surfaces 15e of the casing 15 in a left end 18b and a right end 18c. A cross-sectional form of the roof shaped member 18 is not limited to a simple "mountain form". As shown in FIG. 8B, the roof shaped member 18 may be inclined downward from the left end 18b to the right end 18c. Namely, the roof shaped member 18 may be what is called a "shed roof" type roof. Further, as shown in FIG. 8C, a central "mountain form" roof shaped member 18d may be arranged in a central part and "shed roof" type side roof shaped members 18e may be arranged in both sides of the central "mountain form" roof shaped member 18d in such a way that end parts of the central roof shaped member 18d and end parts of the side roof shaped members 18e are partly superposed. Namely, the central roof shaped member 18d may be arranged, and the side roof shaped members 18e may be arranged in both the sides of the central roof shaped member 18d with spaces provided in a vertical direction so that both the central roof shaped member and the side roof shaped members may be partly superposed in plan view. In such a structure, oil droplets which flow along a lower surface of the central roof shaped member 18d drop on upper surfaces of the side roof shaped members 18e and flow along the upper surfaces of the side roof shaped members 18e. In both the central roof shaped member 18d and the side roof shaped members 18e, since a distance in which the oil droplets flowing along a lower surface thereof is small, the oil droplets more hardly drop. Accordingly, the laminated iron core 3 can be more assuredly restrained from being stained with oil. Further, in the "shed roof" type side roof shaped member 18 shown in FIG. 8B, as shown in FIG. 8D, when the roof shaped member 18 is divided into an upper roof shaped member 18f and a lower roof shaped member 18g and both the upper and lower roof shaped members 18f and 18g are arranged so as to be superposed one upon another in a boundary part thereof, the same effects can be obtained. The roof shaped member 18 mounted on the conveying jig 5 as shown in FIG. 5 may be modified in accordance with FIG. 8B to FIG. 8D.

Figure 9A:
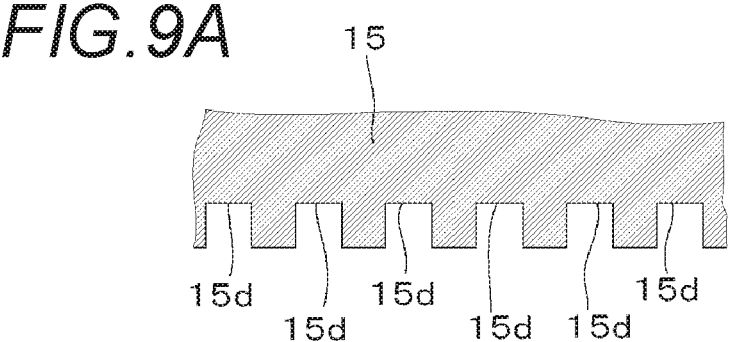
FIGS. 9A and 9B are explanatory views of a configuration of a groove showing a modified example of the present invention and cross-sectional views corresponding to FIG. 2B.
Figure 9B:
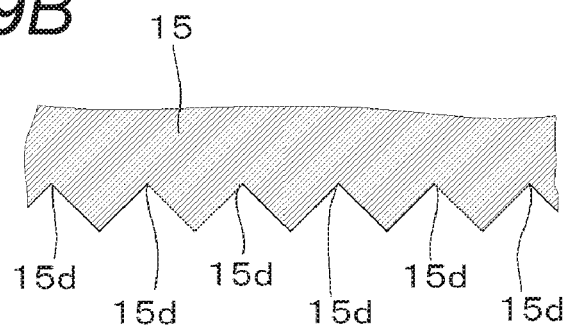

The grooves provided in the canopy surface are not limited to the grooves 15d having corrugated sections shown in FIG. 2B. The grooves 15d may have rectangular sections as shown in FIG. 9A or saw-tooth sections as shown in FIG. 9B.

In the above-described exemplary embodiments respectively, examples are exemplified that the member configuring the canopy surface is arranged in the purge part 7 or in the shutter 13d provided in an entrance of the first cooling part 10. However, a position (a place) where the hood shaped member is arranged is not limited thereto. The hood shaped member may be arranged in other zones or heat-treatment furnaces. Otherwise, the hood shaped member may be arranged in the shutters 13 provided in entrances or exits of other zones or heat-treatment furnaces. Further, when for instance, a tunnel shaped passage is arranged between the heat-treatment furnace and other heat-treatment furnace, the hood shaped member may be arranged in the passage.

In the above-described exemplary embodiments respectively, in order to generate the no-oxidation ambient atmosphere in each of the zones, for instance, the nitrogen gas is introduced. However, gas introduced to the zones respectively, other inert gas may be used or reformed gas such as DX gas or RX gas may be exemplified.

In the above-described exemplary embodiments respectively, as cooling medium introduced and supplied to the cooling pipes 10b and 12b, air is exemplified for the cooling pipe 10b of the first cooling part 10, and water is exemplified for the cooling pipe 12b of the second cooling part 12. However, the cooling medium is not limited to the air or water.

In the above-described exemplary embodiments respectively, as the workpiece, the laminated iron core is exemplified. However, in the present invention, the workpiece is not limited to the laminated iron core. The present invention may be widely applied to the heat-treatment apparatus and the heat-treatment method which uses as the workpiece a laminated body obtained as a result of a blanking or stamping process using the stamping oil and a laminating process.

In the above-described exemplary embodiments respectively, as the workpiece, the laminated iron core is exemplified. However, the workpiece as an object of the heat-treatment apparatus and the heat-treatment method according to the present invention is not limited to the laminated body which is blanked or stamped by using the stamping oil and laminated. The heat-treatment apparatus and the heat-treatment method according to the present invention can be widely applied to the heat-treatment which is available for other products or semi-products as objects.

REFERENCE SIGNS LIST 1 heat-treatment apparatus
2 loading part
3 laminated iron core
3a perpendicular line
3b perpendicular line
3c zone
4 unloading part
5 conveying jig
6 conveyor device
6a driving sprocket wheel
6b driven sprocket wheel
6c slat
6d perpendicular line
6e perpendicular line
6f zone
7 purge part
7a nitrogen gas injection pipe
7b air discharge pipe
8 de-oiling furnace
8a heater
8b discharge pipe
8c nitrogen gas injection pipe
9 annealing furnace
9a heater
9b nitrogen gas injection pipe
10 first cooling part
10a nitrogen gas injection pipe
10b cooling pipe
11 bluing furnace
11a heater
11b gas supply nozzle
12 second cooling part
12a nitrogen gas injection pipe
12b cooling pipe
12c discharge pipe
13c discharge pipe
13 (13a to 13g) shutter
14 controller
15 casing
15a central part
15b left end
15c right end
15d groove
15e wall surface
15f terminal end
15g terminal end
16 oil reservoir part
17 lower end
17a central part
17b left end
17c right end
18 roof shaped member
18a central part
18b left end
18c right end
18d central roof shaped member
18e side roof shaped member
18f upper roof shaped member
18g lower roof shaped member
19 suspension post
20 base post

What is claimed is:

1. A heat-treatment apparatus comprising:
a casing;
a conveyor configured to convey a workpiece to an interior of the casing in order to apply a heat-treatment to the workpiece; and
a canopy surface provided in the casing so as to cover the workpiece, wherein
the canopy surface includes a slope way with respect to a cross-sectional plane taken perpendicular to a conveying direction in which the conveyor conveys the workpiece inside of the casing, and
the slope way includes a highest point and a downward inclined surface extending from the highest point to an outside of a zone between a perpendicular line extending from a left end of the conveyor and a perpendicular line extending from a right end of the conveyor in a front view along the conveying direction of the conveyor.

2. The heat-treatment apparatus according to claim 1, wherein the highest point of the slope way is located between a left end and a right end of the canopy surface and the downward inclined surface is provided in both sides of the highest point and extended toward the left end and the right end of the canopy surface.

3. The heat-treatment apparatus according to claim 1, wherein the highest point of the slope way is located in a left end or a right end of the canopy surface and the downward inclined surface is extended from the highest point toward the other end of the canopy surface.

4. The heat-treatment apparatus according to claim 1, wherein the canopy surface is a ceiling of the casing.

5. The heat-treatment apparatus according to claim 1, wherein the canopy surface is a lower surface of a roof member arranged in the casing.

6. The heat-treatment apparatus according to claim 5, wherein the roof member includes a plurality of roof plates and the plurality of roof plates are arranged with spaces in a vertical direction and are partly superposed in plan view.

7. The heat-treatment apparatus according to claim 1, wherein the canopy surface is a lower surface of a roof member mounted on a conveying jig which moves inside the heat-treatment apparatus together with the workpiece.

8. The heat-treatment apparatus according to claim 1, further comprising:
a gate through which the workpiece passes; and
a shield plate attached to the gate to be freely lifted and lowered, wherein
the canopy surface is formed in a lower end of the shield plate.

9. The heat-treatment apparatus according to claim 1, wherein the canopy surface includes a plurality of grooves extending from a high position to a low position.

10. The heat-treatment apparatus according to claim 1, wherein the casing includes a plurality of sections.

11. The heat-treatment apparatus according to claim 10, wherein the plurality of sections are continuously arranged along the conveying direction of the conveyor.

12. The heat-treatment apparatus according to claim 11, wherein the plurality of sections are separately formed and adjoin along the conveying direction of the conveyor.

13. The heat-treatment apparatus according to claim 1, wherein a lower side of the canopy surface facing the conveyor includes a plurality of grooves extending from a high position to a low position.

14. The heat-treatment apparatus according to claim 1, wherein the canopy surface, when viewed along a vertical section passing through the canopy surface parallel to the conveying direction, extends linearly in a direction parallel to an upper surface of the conveyor.

15. The heat-treatment apparatus according to claim 1, wherein an underside of the canopy surface includes a plurality of oil-directing grooves extending from a high position to a low position.

16. A heat-treatment method performed by the heat-treatment apparatus as defined in claim 1, the method comprising:
conveying the workpiece to the interior of the casing,
applying a heat-treatment to the workpiece inside the casing, wherein
during the heat-treatment to the work piece, oil droplets or water droplets generated in the canopy surface provided in the casing so as to cover the workpiece are guided outside a zone between a perpendicular line extending from a left end of the workpiece and a perpendicular line extending from a right end of the workpiece in a front view along the conveying direction of the conveyor.

* * * * *